United States Patent
Thorneywork et al.

(10) Patent No.: US 8,399,812 B2
(45) Date of Patent: Mar. 19, 2013

(54) COOKING AND STORAGE SYSTEMS

(75) Inventors: Nigel Thorneywork, Surrey (GB); Andrew Brown, Surrey (GB); David Crayfourd, London (GB)

(73) Assignee: Merrychef Limited, Hampshire (GB)

( * ) Notice: Subject to any disclaimer, the term of this patent is extended or adjusted under 35 U.S.C. 154(b) by 0 days.

(21) Appl. No.: 13/252,913

(22) Filed: Oct. 4, 2011

(65) Prior Publication Data
US 2012/0021100 A1    Jan. 26, 2012

Related U.S. Application Data

(62) Division of application No. 11/807,940, filed on May 30, 2007, now Pat. No. 8,058,590.

(30) Foreign Application Priority Data

May 30, 2006    (GB) .................................. 0610567.0

(51) Int. Cl.
*H05B 1/02*    (2006.01)
(52) U.S. Cl. ........................... 219/494; 219/506; 99/325
(58) Field of Classification Search .................. 219/494, 219/497, 506, 473, 484; 99/325–331, 352
See application file for complete search history.

(56) References Cited

U.S. PATENT DOCUMENTS

| | | | |
|---|---|---|---|
| 5,868,195 | A | 2/1999 | Westbrooks, Jr. |
| 6,137,095 | A | 10/2000 | Kashimoto et al. |
| 6,850,861 | B1 | 2/2005 | Faiola et al. |
| 6,862,494 | B2 | 3/2005 | Hu et al. |
| 6,904,969 | B2 | 6/2005 | Mueller et al. |
| 7,328,654 | B2 | 2/2008 | Shei |

FOREIGN PATENT DOCUMENTS

| | | |
|---|---|---|
| GB | 2354603 A | 3/2001 |
| JP | 08221654 A | 8/1996 |
| WO | 2004030414 A1 | 4/2004 |
| WO | 2004075125 A1 | 9/2004 |

OTHER PUBLICATIONS

European Search Report Issued Oct. 3, 2006 in Related GB0610567.0.

*Primary Examiner* — Mark Paschall
(74) *Attorney, Agent, or Firm* — Ohlandt, Greeley, Ruggiero & Perle, L.L.P.

(57) ABSTRACT

A cooking and storage system comprises a refrigeration device, a cooking device and controller for controlling the cooking device, and the refrigeration device provides to the controller temperature information relating to the temperature within the refrigeration device.

4 Claims, 2 Drawing Sheets

COOKING AND STORAGE SYSTEMS

CROSS-REFERENCED APPLICATIONS

This application is a divisional application of U.S. patent application Ser. No. 11/807,940, filed on May 30, 2007 now U.S. Pat. No. 8,058,590 which claims priority to Application GB0610567.0, filed on May 30, 2006 both of which are incorporated herein in their entirety by reference thereto.

BACKGROUND

1. Field of the Disclosure

The invention relates to cooking and storage systems.

2. Discussion of the Background Art

It is of course known to store food in refrigeration devices, such as fridges and freezers, and to heat or cook food in a variety of different oven types, such as microwave ovens, convection ovens and combination ovens which use a combination of microwave and conventional heating.

Often the refrigeration device and the cooking device are placed in close proximity to each other, which makes it convenient for a user to remove food from the refrigeration device and place it in the cooking device. In some cases this is done at the point of sale, in which case the food may be moved from the refrigeration device to the cooking device by the seller of the food product or by the purchaser. The latter method is sometimes used where food is sold at petrol service stations, and this allows customers to heat their own food products, either before or after paying for them, without involving the staff.

SUMMARY OF THE DISCLOSURE

A cooking and storage system comprising a refrigeration device, a cooking device and controller for controlling the cooking device, characterised in that the refrigeration device provides to the controller temperature information relating to the temperature within the refrigeration device. The system further comprising a data entry input for supplying to the controller information specifying a type of food product placed within the cooking device, and wherein the controller is arranged to control the cooking device to perform a sequence of cooking operations which depends on the type of food product.

The controller controls the cooking device to perform a sequence of cooking operations which depends on the temperature information provided by the refrigeration device.

The refrigeration device is arranged to store different types of food product at different temperatures, and is arranged to provide the different temperatures to the controller.

The system further comprises a holding cabinet for holding food products after cooking by the cooking device. The holding cabinet comprises heater. The system further comprises a holding cabinet controller for controlling the heater depending on the type of food product cooked by the cooking device. The holding cabinet controller is the controller.

A method of controlling a cooking and storage system comprising a refrigeration device, cooking device and controller for controlling the cooking device, the method comprising: a user removing a food product from the refrigeration device and placing it in the cooking device; providing the controller with information identifying the type of food product; the refrigeration device providing temperature information to the controller specifying the temperature at which the food product has been stored within the refrigeration device; and the controller controlling the cooking device to perform a sequence of cooking operations which depend on both the type of food product and the temperature information.

The method further comprises the steps of: after cooking the food product within the cooking device, placing the food product within a holding cabinet provided with heater controlled by a holding cabinet controller, automatically passing information to the holding cabinet controller relating to the type of food product which has been cooked by the cooking device; and the holding cabinet controller controlling the operation of the heater depending on the type of food product. The controller and the holding cabinet controller are one and the same device. Preferably, each type of food product is provided with a different code, and wherein the step of providing the controller with information identifying the type of food product involves the user entering the relevant code.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENT

Figure 1:
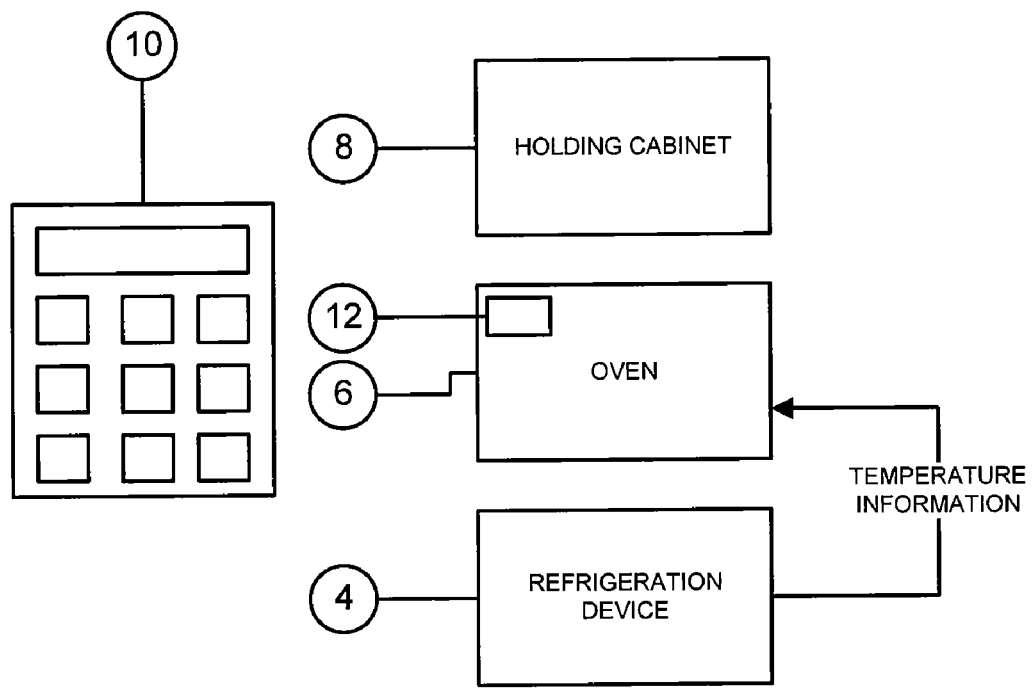
FIG. 1 is a schematic representation of a cooking and storage system.

FIG. 1 shows a cooking and storage system 2 comprising a refrigeration device 4, a cooking device 6 and a holding cabinet 8. The refrigeration device 4, cooking device 6 and holding cabinet 8 may be combined as a single unit, or any two of them may be combined as a single unit, or the devices may be physically separate but connected together either using wires or wirelessly, as described below.

In use, a user removes food from the refrigeration device 4 and places it in the cooking device 6. A keypad 10 (or other device) is provided for the user to enter the type and/or weight of the food product and/or cooking instructions. In one embodiment each type of food product in the refrigeration device 4 may be provided with a code, and the user may be required to enter that code into the keypad 10.

The cooking device may be provided with a control unit, shown schematically as item 12 in FIG. 1. The control unit may comprise a microprocessor. If each type of food product is provided with a code, the code is passed from the keypad 10 to the control unit 12 and is used to allow the control unit 12 to determine a suitable cooking sequence for that type of food product.

It will be appreciated that the information provided to the control unit 12 by the keypad 10 could be sent to the control unit in other ways, for example by scanning a barcode on the food product.

The refrigeration device 4 also provides information to the control unit 12. This information relates to the storage conditions within the refrigeration device 4. For example, the refrigeration device 4 may supply the control unit 12 with the temperature within the refrigeration device 4. If the refrigeration device 4 contains compartments which are held at different temperatures, for example for different types of food product, then the refrigeration device 4 may provide the control unit 12 with the relevant temperature depending on the type of food product to be cooked in the cooking device 6. The control unit 12 may determine the relevant temperature when the user enters information on the keypad (10) which identifies the type of food product to be cooked.

In alternative embodiments the refrigeration device 4 may provide the control unit 12 with an estimate of the actual temperature of the food product which has been removed from the refrigeration device 4, and this estimate may take into consideration both the temperature within the refrigeration device 4 and the length of time the food product has been in the refrigeration device 4.

Information which is passed between any of the devices in FIG. 1 may be passed by wired or wireless means. In some embodiments the various devices may be wired together within a single housing, and in other embodiments the devices may be spaced apart and communicate wirelessly with each other.

The control unit 12 may be programmed with various different cooking sequences for different types of food product, and these cooking sequences may take into account the temperature information received from the refrigeration device 4, for example using suitable algorithms.

Because the control unit 12 is aware of the initial temperature of the food products when they are removed from the refrigeration device 4, the control unit 12 is able to ensure that each food product is correctly and properly cooked. This not only provides a more pleasing result for the user, but also provides a food safety advantage by avoiding the possibility of food products being consumed when they have not been fully cooked.

The control unit 12 may be provided within the cooking device 6, but can also be placed in any other suitable location, which need not necessarily be within the cooking device 6.

The holding cabinet 8 is used to store food products after they have been cooked in the cooking device 6. The holding cabinet 8 may be in the form of a display cabinet which allows users to see its contents, for example through a glass door or panel. The holding cabinet 8 may also be provided with a heating device (not shown) for keeping the food products at a suitable temperature before they are consumed.

The temperature within the holding cabinet 8 may be controlled in dependence on the type of food product placed in the holding cabinet 8 after cooking in the cooking device 6. The temperature within the holding cabinet 8 can be controlled in any suitable manner. For example, the temperature within the holding cabinet 8 may be controlled directly by the control unit 12, or by a separate control unit (not shown) which receives information from the control unit 12 or from the keypad 10 relating to the type of food product being cooked.

The cooking and storage system 2 of FIG. 1 may be provided with a display for displaying information to the user. The display may be of any suitable type, for example LED or LCD, and may be provided on the holding cabinet 8, cooking device 6 or refrigeration device 4, or in any other convenient location.

Figure 2:
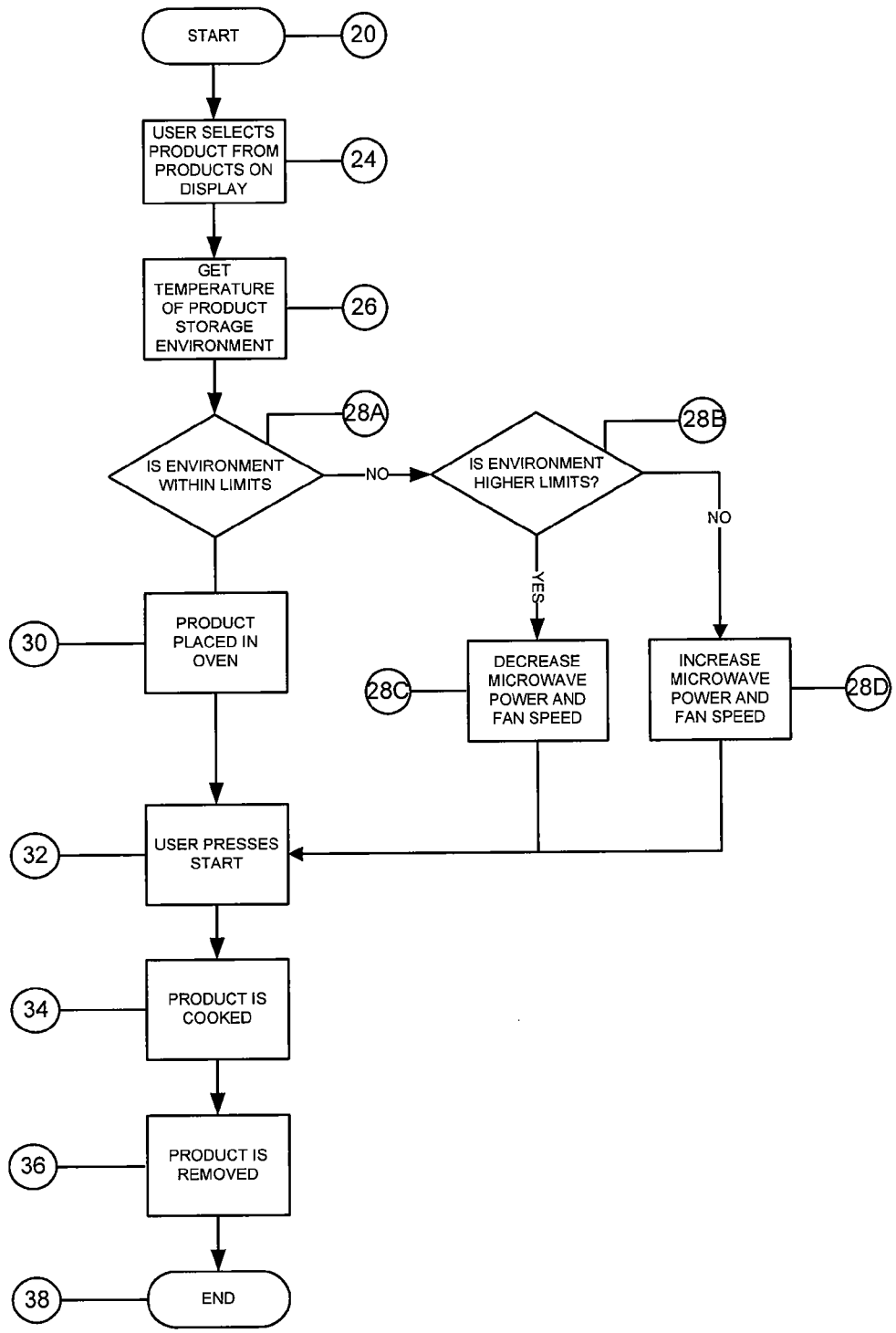
FIG. 2 is a flow-chart showing a possible sequence of operations involving the cooking and storage system of FIG. 1.

FIG. 2 shows a flow-chart showing the sequence of operations in one possible embodiment of the invention.

The system is started at step 20. At step 24 a user removes a food product from the refrigeration device 4, and enters the type of food product on the keypad (10).

At step 26 the control unit 12 obtains the storage temperature of the food product from the refrigeration device 4. In steps 28*a* to 28*d* the microwave power and fan speed of the cooking device 6 are controlled by the control unit 12 depending on the type of food product and the temperature environment in which it has been stored in the refrigeration device 4. At step 28*a*, if the food has been stored within certain limits, then no adjustment of the microwave power and fan speed is necessary, and the process proceeds to step 30. At step 28*b*, if the food has been stored in an environment which is higher than certain limits the process proceeds to step 28*c*, otherwise the process proceeds to step 28*d*.

At step 30 the user places the food product into the cooking device 6, and at step 32 the user presses a start button, which may be provided on the keypad 10. The product is cooked at step 34 in accordance with a suitable algorithm which takes into account the food type and storage temperature, and at step 36 product is removed from the cooking device 6. The process ends at step 38.

What is claimed is:

1. A method of controlling a cooking and storage system comprising a refrigeration device, a cooking device and a controller for controlling the cooking device, the method comprising:

storing a plurality of different types of food products in a plurality of food compartments of said refrigeration device at different temperatures, wherein each of said temperatures is dependent on a corresponding one of said food types;

removing a one of said food products from a corresponding one of said food compartments of said refrigeration device and placing it in said cooking device;

providing said controller with information identifying said food type of said removed food product;

said refrigeration device providing temperature information to said controller specifying a corresponding one of said temperatures at which said removed food product has been stored within said refrigeration device; and said controller controlling the cooking device to perform a sequence of cooking operations, which depend on both said food type of said removed food product and said temperature information.

2. A method as claimed in claim 1, further comprising:

after cooking said food product within said cooking device, placing said removed food product within a holding cabinet provided with a heater controlled by a holding cabinet controller;

automatically passing information to said holding cabinet controller relating to said food type of said removed food product which has been cooked by said cooking device; and said holding cabinet controller controlling operation of said heater depending on said food type of said removed food product.

3. A method as claimed in claim 2, wherein said controller and said holding cabinet controller are one and the same device.

4. A method as claimed in claim 1, wherein each food type of said food products is provided with a different code, and wherein said step of providing said controller with information identifying said food type of said removed food product involves a user entering the relevant code.

* * * * *